United States Patent
Millhaem et al.

(10) Patent No.: US 11,047,306 B1
(45) Date of Patent: Jun. 29, 2021

(54) GAS TURBINE ENGINE REVERSE BLEED FOR COKING ABATEMENT

(71) Applicant: General Electric Company, Schenectady, NY (US)

(72) Inventors: Michael R. Millhaem, Cincinnati, OH (US); Byron Andrew Pritchard, Loveland, OH (US); Hendrik Pieter Jacobus de Bock, Clifton Park, NY (US); John Carl Glessner, Kings Mills, OH (US); Jeffrey Scott Ksander, Deerfield Township, OH (US); Craig A. Gonyou, Blanchester, OH (US); Christopher Jon Potokar, Whitefish Bay, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/800,677

(22) Filed: Feb. 25, 2020

(51) Int. Cl.
*F02C 7/18* (2006.01)
*F02C 9/18* (2006.01)
*F01D 25/12* (2006.01)

(52) U.S. Cl.
CPC .............. *F02C 7/18* (2013.01); *F02C 7/185* (2013.01); *F02C 9/18* (2013.01); *F01D 25/12* (2013.01); *F05D 2220/323* (2013.01); *F05D 2260/232* (2013.01)

(58) Field of Classification Search
CPC .............. F02C 7/18; F02C 7/185; F02C 9/18
See application file for complete search history.

(56) References Cited

U.S. PATENT DOCUMENTS

| 2,031,541 A | 2/1936 | MacClain |
| 2,970,436 A | 2/1961 | Sims, Jr. |
| 4,474,001 A | 10/1984 | Griffin et al. |
| 4,776,536 A | 10/1988 | Hudson et al. |
| 5,012,639 A | 5/1991 | Ream et al. |
| 5,123,242 A | 6/1992 | Miller |
| 5,127,222 A | 7/1992 | Ream et al. |
| 6,125,624 A | 10/2000 | Prociw |
| 6,134,880 A | 10/2000 | Yoshinaka |

(Continued)

FOREIGN PATENT DOCUMENTS

| EP | 1884628 | 2/2008 |
| EP | 2442195 | 4/2012 |

(Continued)

*Primary Examiner* — Katheryn A Malatek
(74) *Attorney, Agent, or Firm* — Dority & Manning, P.A.

(57) ABSTRACT

A turbine engine includes: a core cowl, a core within the core cowl, the core including a compressor having a bleed port; an undercowl space; a cooling duct at least partially in the undercowl space and having an inlet and an outlet, the inlet communicating with a source of cooling air, the outlet communicating with the compressor bleed port; a valve assembly in the cooling duct; and a cooling blower operable to move air flow from the inlet of the cooling duct towards the outlet of the cooling duct and into the compressor bleed port. A method of cooling an engine having a core cowl and a compressor, combustor and turbine includes: operating the engine; shutting the engine down; after or during engine shutdown, operating a cooling blower internal to the engine cowl, to force air through the compressor by way of a compressor bleed port.

27 Claims, 4 Drawing Sheets

(56) References Cited

U.S. PATENT DOCUMENTS

| | | |
|---|---|---|
| 6,202,403 B1 | 3/2001 | Laborie |
| 6,244,034 B1 | 6/2001 | Taylor et al. |
| 6,305,156 B1 | 10/2001 | Lui |
| 7,329,084 B2 | 2/2008 | Dittmann |
| 7,520,136 B2 | 4/2009 | Kervistin et al. |
| 7,766,610 B2 | 8/2010 | Busekros |
| 7,823,374 B2 | 11/2010 | Venkataramani et al. |
| 7,845,159 B2 | 12/2010 | Venkataramani et al. |
| 7,891,191 B2 | 2/2011 | Yoshida et al. |
| 7,900,437 B2 | 3/2011 | Venkataramani et al. |
| 8,015,788 B2 | 9/2011 | Stephenson et al. |
| 8,047,003 B2 | 11/2011 | Yoshida et al. |
| 8,069,827 B2 | 12/2011 | Watanabe et al. |
| 8,167,531 B2 | 5/2012 | Mollmann et al. |
| 8,210,801 B2 | 7/2012 | Ballard, Jr. et al. |
| 8,395,275 B2 | 3/2013 | Blewett et al. |
| 8,397,487 B2 | 3/2013 | Sennoun et al. |
| 8,991,191 B2 | 3/2015 | Diaz et al. |
| 9,038,399 B2 | 5/2015 | MacFarlane |
| 9,091,171 B2 | 7/2015 | Rodriguez |
| 9,260,974 B2 | 2/2016 | Hasting et al. |
| 9,316,153 B2 | 4/2016 | Patat et al. |
| 9,932,856 B2 | 4/2018 | Zhang et al. |
| 9,989,257 B2 | 6/2018 | Prociw et al. |
| 10,337,405 B2 | 7/2019 | Steen et al. |
| 10,371,063 B2 | 8/2019 | Moniz et al. |
| 10,400,672 B2 | 9/2019 | Frish et al. |
| 10,443,622 B2 | 10/2019 | Rasmussen |
| 2006/0080950 A1 | 4/2006 | Czachor |
| 2006/0174628 A1 | 8/2006 | Mikhail |
| 2008/0238202 A1 | 10/2008 | Kern |
| 2009/0175718 A1 | 7/2009 | Diaz et al. |
| 2009/0297342 A1 | 12/2009 | Laborie |
| 2010/0236502 A1 | 9/2010 | Watanabe et al. |
| 2011/0120075 A1 | 5/2011 | Diaz et al. |
| 2013/0098047 A1 | 4/2013 | Suciu |
| 2013/0227960 A1 | 9/2013 | Bonner |
| 2013/0228647 A1 | 9/2013 | Bystry, Jr. |
| 2013/0283762 A1 | 10/2013 | Simpson et al. |
| 2013/0319016 A1 | 12/2013 | Fontanel et al. |
| 2014/0077116 A1 | 3/2014 | Walker Santiago et al. |
| 2014/0077507 A1 | 3/2014 | Barnett |
| 2014/0083106 A1 | 3/2014 | Mackin et al. |
| 2014/0318759 A1 | 10/2014 | Ellis et al. |
| 2014/0333127 A1 | 11/2014 | Edwards |
| 2015/0247462 A1 | 9/2015 | Suciu |
| 2015/0252683 A1 | 9/2015 | Hasting et al. |
| 2015/0267616 A1 | 9/2015 | Verseux |
| 2015/0330310 A1 | 11/2015 | deGaribody |
| 2016/0123185 A1 | 5/2016 | Le Pache et al. |
| 2016/0201917 A1 | 7/2016 | Dautova et al. |
| 2016/0230677 A1 | 8/2016 | Feulner |
| 2016/0332743 A1 | 11/2016 | Teicholz |
| 2017/0184025 A1 | 6/2017 | Sawyers-Abbott |
| 2017/0191419 A1 | 7/2017 | Bayraktar et al. |
| 2017/0234224 A1 | 8/2017 | Adibhatla |
| 2017/0342855 A1 | 11/2017 | Hon |
| 2017/0370291 A1 | 12/2017 | Rambo |
| 2018/0128178 A1 | 5/2018 | Snape |
| 2018/0134407 A1* | 5/2018 | Elbibary ............... F02K 3/075 |

FOREIGN PATENT DOCUMENTS

| | | |
|---|---|---|
| FR | 2955896 | 8/2011 |
| FR | 2955897 | 8/2011 |
| JP | 2004308616 | 11/2004 |
| JP | 2007262901 | 10/2007 |

\* cited by examiner

GAS TURBINE ENGINE REVERSE BLEED FOR COKING ABATEMENT

BACKGROUND OF THE INVENTION

This invention relates generally to cooling a gas turbine engine and, more particularly, to a method and apparatus for reducing post-shutdown engine temperatures.

During normal operations, temperatures of gas turbine engine components are maintained within allowable limits by a plurality of cooling processes that transfer heat from the components to one or more heat sinks. When the engine is shutdown, most cooling systems no longer operate. Residual heat in certain engine components (i.e. "soakback") can increase the temperature of other engine components beyond allowable limits.

A particular concern is the formation of carbon (or "coke") deposits in fuel carrying components including fuel nozzles when a hydrocarbon fuel (liquid or gas) is exposed to high temperatures in the presence of oxygen.

Some known methods of mitigating coking include rotating the rotor after engine shutdown (i.e. "motoring") or purging the engine with forced air provided from an auxiliary power unit ("APU"), ground power unit ("GPU"), or air conditioning unit after shutdown.

One problem with these methods is that they require resources such as electrical power, fuel, external equipment, and/or logistical support that may be unavailable or impractical.

BRIEF DESCRIPTION OF THE INVENTION

This problem is addressed by a cooling apparatus which may be internal to a gas turbine engine. The apparatus forces cooling air through a bleed port of the engine.

According to one aspect of the technology described herein, a gas turbine engine includes: a core cowl, a core contained within the core cowl, including a compressor in fluid communication with a downstream combustor and turbine, the compressor including a compressor bleed port, wherein an undercowl space is defined between the core cowl and the core; a cooling duct disposed at least partially in the undercowl space and having an inlet and an outlet, wherein the inlet is in fluid communication with a source of cooling air, and the outlet is in fluid communication with the compressor bleed port; a valve assembly including at least one valve disposed in the cooling duct; and a cooling blower disposed within the engine and operable to move an air flow from the inlet of the cooling duct towards the outlet of the cooling duct and into the compressor bleed port.

According to another aspect of the technology described herein, a method includes: using an engine comprising a cowl, an undercowl space, a compressor in fluid communication with a downstream combustor and turbine, wherein the compressor includes a compressor bleed port; at a time when the engine is operating, substantially preventing airflow from the bleed port to the undercowl space; at a time when the engine is shut down, permitting airflow from the undercowl space to the compressor and operating a cooling blower located internal to the cowl to cause air to flow from the undercowl space into the compressor bleed port.

According to another aspect of the technology described herein, a method includes: using an engine comprising a core cowl, an under cowl space, and a compressor in fluid communication with a downstream combustor and turbine, the compressor having a compressor bleed port; operating the engine; shutting the engine down; and after or during engine shutdown, operating a cooling blower internal to the core cowl, to force air from a cooling air source through at least a portion of a flowpath of the engine by way of the compressor bleed port.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
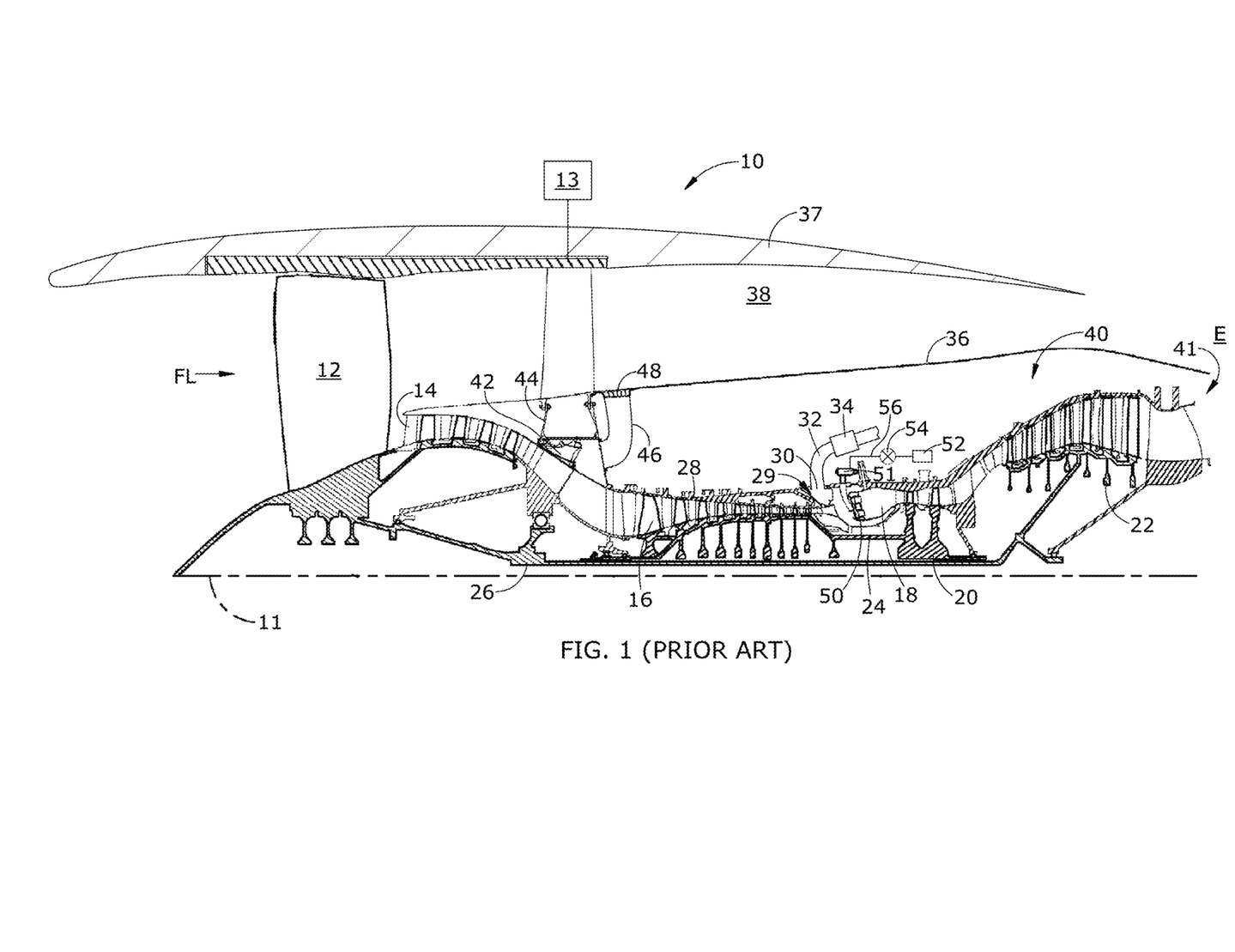
FIG. 1 is a cross-sectional, schematic view of a prior art gas turbine engine.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, unducted fan engines or open rotor engines, etc., as well as turbine engines having any number of compressor-turbine spools. The engine 10 has a longitudinal center line or axis 11. Operation of the engine 10 may be controlled in whole or in part by an electronic engine controller shown schematically at 13. One example of such an electronic engine controller 13 is a full authority digital engine control ("FADEC"). It will be understood that the engine controller 13 may be mounted in any convenient location or in the engine 10, including but not limited to within a fan nacelle, or within an undercowl space (described below).

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "FL" in FIG. 1. These directional terms are used merely for convenience in description and do not require a particular orientation of the structures described thereby.

The engine 10 has a fan 12, booster 14, high-pressure compressor or "HPC" 16, combustor 18, high pressure turbine or "HPT" 20, and low-pressure turbine or "LPT" 22, arranged in serial flow relationship. Collectively, the fan 12, booster 14, and LPT 22 define a low-pressure system or low-pressure spool of the engine. Collectively, the HPC 16, combustor 18, and HPT 20 define a high-pressure spool of the engine 10, also referred to as a "core" or "core engine".

In operation, pressurized air exiting the HPC 16 is mixed with fuel in the combustor 18 and ignited, thereby generating combustion gases. Some work is extracted from these gases by the HPT 20 which drives the HPC 16 via an outer shaft 24. The combustion gases then flow into the LPT 22, which drives the fan 12 and booster 14 via an inner shaft 26. As used herein, the engine 10 is considered to be "operating" when fuel is being is supplied to and burned in the combustor, and the resulting combustion gases are driving rotation of at least the core. As used herein, the engine 10 is considered to be "shut down" when fuel is not being supplied to the combustor. It will be understood that "operating" encompasses numerous operating conditions having varying rotor speeds and varying thrust and/or power outputs. It will be understood that one or more the rotors of the engine 10 may be rotating when fuel is not being provided. This may occur, for example because of wind passing through the engine 10 on the ground, relative wind passing through the engine during aircraft flight (i.e., "wind milling"), or rotation by torque applied from a starter or similar apparatus.

The HPC 16 includes a number of stages of rotating blades and stationary vanes, all surrounded by a compressor casing 28. The compressor casing 28 incorporates a compressor bleed plenum 29 in fluid communication with the compressor flowpath and in fluid communication with the exterior of the compressor casing 28 through at least one compressor bleed port 30. The compressor bleed plenum 29 may extend over all or a portion of the circumference of the compressor casing 28. It will be understood that different engines may include one or more bleed ports and a particular engine may or may not include a bleed plenum of the type illustrated. As used herein, the term "compressor bleed port" is used generically to refer to a port, opening, plenum, or passage in compressor casing 28 or other analogous structure that is directly or indirectly in fluid communication with the compressor flowpath. The term "compressor bleed port" may refer to an existing structure within the engine 10, or a structure that is newly added to accommodate the reverse bleed apparatus described herein.

One or more bleed ducts 32 are coupled to the compressor bleed port 30 and are configured to conduct extracted airflow away from the HPC 16. The extracted air may be vented for the purpose of controlling the compressor operating line. Alternatively, it may be used for purposes such as environmental control systems ("ECS"), pneumatically-powered actuators, engine hot section cooling, and/or clearance control systems. The bleed duct 32 may include a bleed control valve 34 operable to move between open and closed positions, thereby controlling flow through the compressor bleed port 30.

The engine core is surrounded by (i.e. is contained within) a core cowl 36 or core nacelle which defines an inboard boundary of a bypass flowpath 38 over which fan bypass air flows. Shown is a ducted turbofan, which includes a fan 12 surrounded by a fan nacelle 37 which is spaced-away from the core cowl 36 and defines an outboard boundary of the bypass flowpath 38. In this example the bypass flowpath 38 could also be referred to as a "fan duct". Alternatively, in the case of an open rotor engine, fan nacelle 37 would not be present and the bypass flowpath 38 would be bounded only by an outer surface of the core cowl 36. The space inboard of the core cowl 36 is referred to as "undercowl space" 40. In practice, the undercowl space 40 may be vented to ambient external environment "E", for example through a vent 41 (shown schematically in FIG. 1). Things that are said to be internal to the engine, for purposes of this disclosure, means things that are located within the space surrounded by the fan nacelle 37, or the core cowl 36 (in a case such as an open rotor engine where the fan nacelle 37 is not present).

The engine 10 may optionally incorporate a variable bleed valve ("VBV") system for controlling booster stall margin. The VBV system includes one or more variable bleed valves 42 mounted within a fan hub frame 44. The variable bleed valves 12 are open during low power operation of the engine 10, such as at idle, for bleeding a portion of the compressed air. The variable bleed valves 42 are closed at high power operation of the engine 10, such as during cruise or takeoff, since bleeding is no longer required. When the variable bleed valves 42 are open, air is passed from the booster flowpath through the fan hub frame 44 and into a bypass duct or more generally the bypass space external of the nacelle 37. In the illustrated example, the engine 10 includes at least one bypass duct 46 defining an air flowpath from the fan hub frame 44 to a bleed vent 48 communicating with the bypass flowpath 38.

The combustor 18 includes a plurality of fuel nozzles 50 which are supplied during engine operation with pressurized liquid fuel. The fuel nozzles 50 are connected to a fuel system 52 operable to supply a flow of pressurized liquid fuel at varying flowrates according to operational need. As depicted schematically, the fuel system 52 supplies fuel through a fuel valve 54 coupled to a fuel conduit 56, which is in turn coupled the fuel nozzles 50. Each fuel nozzle 50 may be associated with one or more pressure-responsive fuel nozzle valves 51 which are typically located in an outer portion of the fuel nozzle's stem. In some embodiments, the fuel nozzles 50 and fuel system 52 may implement more than one independent fuel flow circuit (e.g. pilot and main circuits).

It will be understood that each fuel nozzle 50 is generally a metallic mass including numerous small passages and orifices. The fuel nozzles 50 are subject to the formation of carbon (or "coke") deposits when a hydrocarbon fuel is exposed to high temperatures in the presence of oxygen. This process is referred to as "coking" and is generally a risk when temperatures exceed about 177° C. (350° F.).

During engine operation, both fuel and compressed air flow through the fuel nozzles 50, and the fuel nozzles 50 are bathed in an external flow of relatively cool compressor discharge air. All of these flows carry away heat from the fuel nozzles 50, keeping fuel temperatures relatively low.

When engine operation stops, a volume of fuel will continue to reside in the fuel nozzles 50 and can be heated to coking temperatures. Small amounts of coke interfering with fuel flow through these orifices can make a large difference in fuel nozzle performance. Eventually, build-up of carbon deposits can block fuel passages sufficiently to degrade fuel nozzle performance or prevent the intended operation of the fuel nozzle to the point where cleaning or replacement is necessary to prevent adverse impacts to other engine hot section components and/or restore engine cycle performance.

The inventors' analysis and testing has shown that if a flow of air at an appropriate pressure and flow rate is provided back through the compressor bleed port 30, this flow ("a reverse bleed") can preferentially flow downstream from the HPC 16 and provide cooling to the fuel nozzles 50 so as to reduce or prevent fuel nozzle coking.

Figure 2:
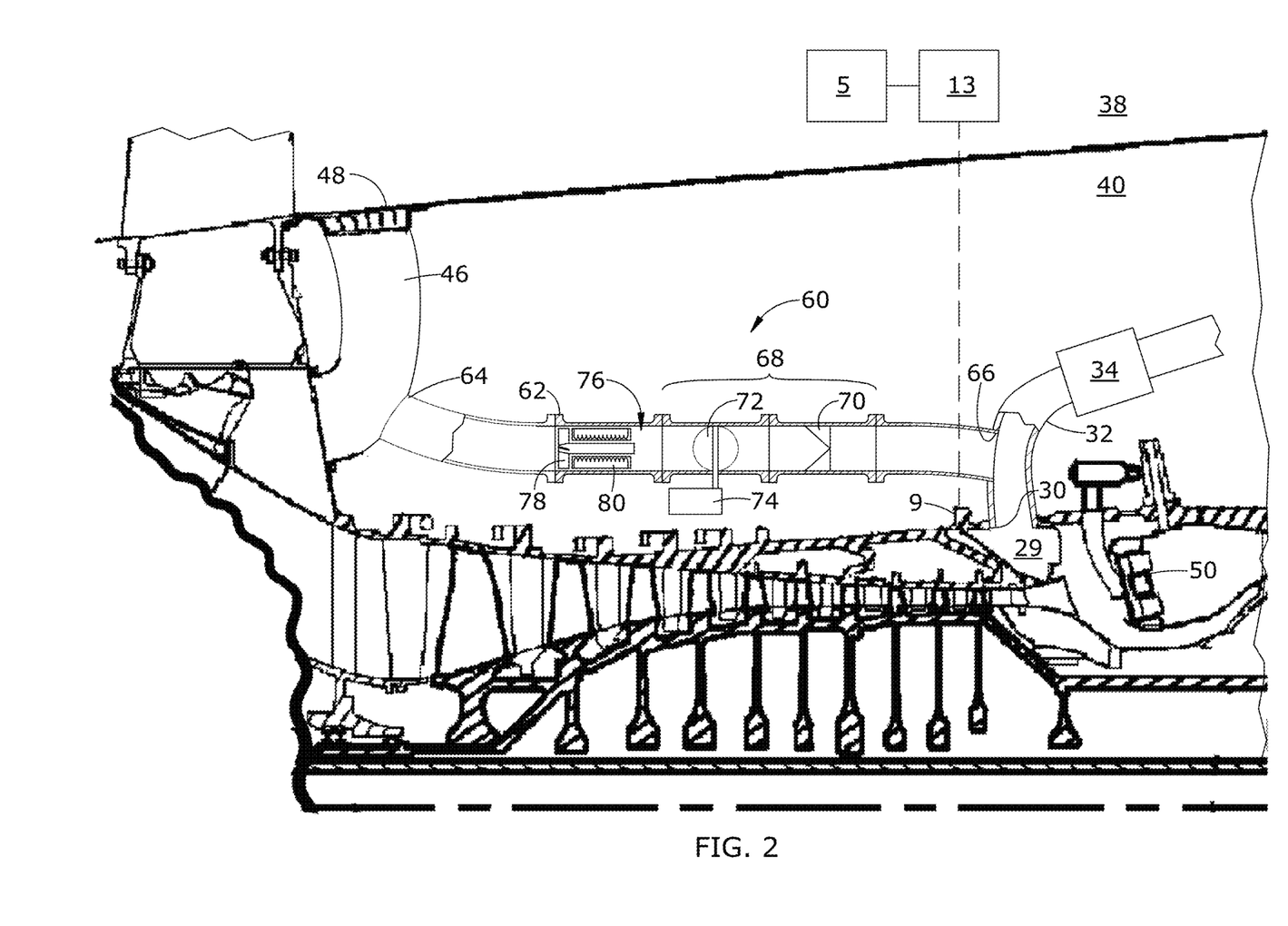
FIG. 2 is a schematic, sectional view of an exemplary embodiment of a reverse bleed apparatus suitable for use with the gas turbine engine of FIG. 1.

FIG. 2 illustrates an apparatus that may be incorporated into the engine 10 and used to supply cooling air to the fuel nozzles 50 through the compressor bleed port 30 when the engine 10 is shut down. This may be referred to generally herein as a "reverse bleed apparatus" 60.

The reverse bleed apparatus 60 includes a cooling duct 62 disposed in the engine 10. It may be mounted, for example, wholly or partially in the undercowl space 40 (i.e., "internal to" the undercowl space 40. The cooling duct has an inlet 64 disposed in fluid communication with a source of cooling air and an outlet 66 disposed in fluid communication with the compressor bleed port 30. The complete cooling duct 62 may be built up from components such as tubes, connectors, pipe joints, and the like. In the embodiment of FIG. 2, the inlet 64 is connected in fluid communication with an existing bypass duct 46. In the embodiment of FIG. 2, the outlet 66 is connected to existing bleed duct 32, which in turn is connected to the compressor bleed port 30.

The cooling duct 62 incorporates a valve assembly 68 including one or more valves operable to control airflow between the inlet 64 and the outlet 66. Two or more valves may be used to provide redundancy, and/or monitor or control airflow through duct 62 based on engine operating conditions. In this example, first and second valves 70, 72 are used in series, where the first valve 70 is closest to the outlet 66. Stated another way, the first and second valves 70, 72 are in "series fluid communication", meaning that a fluid flow passes through one valve before encountering another valve. "Series flow communication" stands in contrast to "parallel flow communication".

In the illustrated example, the first valve 70 is a check valve which is passively biased towards an open position by a spring, stored fluid pressure, weight, or other suitable mechanism and arranged to permit airflow in a direction from the inlet 64 towards the outlet 66, but to block airflow in the opposite direction. It will be understood that all valves exhibit some fluid leakage even in the closed position. Accordingly, the operation of a valve in the closed position to block airflow, except for inherent leakage, may be described as "substantially preventing flow".

In the illustrated example, the second valve 72 is a controllable valve having a flow control element (e.g. gate or ball) movable between open and closed positions. In the open position, the second valve 72 permits airflow between the inlet 64 and the outlet 66. In the closed position, the second valve 72 blocks airflow between the inlet 64 and the outlet 66.

Numerous types of controllable valves may be used. In one example, the controllable valve may incorporate or be coupled to an actuator 74 which provides motive force for the valve's flow control element. Examples of suitable types of actuators include pneumatic, hydraulic, or electrical devices.

In one example, the controllable valve may be of a type in which a spring or similar element urges the controllable valve towards an open position, and fluid pressure acts in opposition to the spring to move the valve towards the closed position. Suitable fluids could include, for example compressed air, pressurized oil, or pressurized fuel. In one example, the controllable valve may be coupled to the fuel system 52 described above (see FIG. 1) in such a manner that pressurized fuel is provided to the valve during engine operation. The fuel pressure thus tends to keep the valve closed when the engine 10 is operating. This type of valve may be referred to as a fluid-pressure-responsive passive valve, for example a "passive fuel valve".

In this specific example where one of the first and second valves 70, 72 is a check valve and the other of the first and second valves 70, 72 is a controllable valve, either valve may be placed in the upstream or downstream position relative to the other valve. However, check valves tend to close more reliably when subjected to a greater pressure differential. The first valve 70 would inherently be exposed to a higher air pressure, being closer to the compressor bleed port 30. Accordingly, the first valve 70 may advantageously be a check valve.

The cooling duct 62 includes a cooling blower 76 between the valve assembly 68 and the inlet 64. The cooling blower 76 may be any apparatus operable to blow, pump, or move a cooling airflow from the inlet 64 towards the outlet 66. In the illustrated example, the cooling blower 76 includes a rotor 78 carrying a plurality of fan blades. The blower 76 may, in the alternative, be located at, within or proximate to the inlet 64 and distal of the valves 72, 70.

A power source for operating the cooling blower 76 may be mechanical, hydraulic, pneumatic, or electrical. In the illustrated example, the blower's rotor 78 is coupled to an electric motor 80. In one example, the motor 80 may be an AC induction motor or DC motor.

The cooling blower 76 may be sized to provide an adequate discharge pressure and flow rate for the cooling process described in more detail below. As one example, the cooling blower 76 may be sized to produce air flow on the order of approximately 0.05 kg/s (0.1 lb/s) to approximately 0.23 kg/s (0.5 lb/s) at approximately 0.69 kPa (0.1 psi) to approximately 6.9 kPa (0.5 psi). In one exemplary end use, the cooling blower 76 may be sized to produce air flow on the order of approximately 0.12 kg/s (0.25 lb/s) at approximately 3.4 kPa (0.5 psi).

Operation of the reverse bleed apparatus 60 is generally as follows. When the engine 10 is running, the reverse bleed apparatus 60 is inactive. Portions of the cooling air duct 62 will be pressurized with high-temperature air coming from the compressor bleed port 30. The valve assembly 68 will block the majority of the flow from the outlet 66 towards the inlet 64. As noted above, some valve leakage is expected to occur. Any leakage will pass through the cooling blower 76, inlet 64, and in the example of FIG. 2, through the bypass duct 46 and vent 48.

After engine shutdown, soakback begins occurring which may heat the fuel nozzles 50 to an unacceptable temperature. The reverse bleed apparatus 60 is used to move cooling air flow from the inlet 64 through the cooling duct 62, through the outlet 66 and into the compressor bleed port 30. Subsequently, the cooling air can pass over the fuel nozzles 50 and other parts of the core to lower their respective temperatures and to reduce or prevent coking. Fundamentally, the reverse bleed apparatus 60 is employed by (1) operating the cooling blower 76 and (2) opening the valve or valves of the valve assembly 68, at a time when the engine 10 is shut down.

As a possible alternative, the reverse bleed apparatus 60 could be used to move cooling air flow from downstream portions of the engine 10, through the compressor bleed port 30, through the outlet 66, through the cooling duct 62, and out through the inlet 64. In this sense the so-called "reverse bleed" apparatus 60 would be used to cause air movement through the bleed port in the same direction as airflow through the bleed port during flight. This could be accomplished by assuring that all valves are open or otherwise configured to permit flow in this direction and operating the cooling blower 76 to move air in the opposite direction as described above. Stated another way, the cooling blower 76 could be used to "suck" air from the engine 10 rather than "blow" it into the engine 10.

Numerous arrangements are possible for control and operation of the reverse bleed apparatus 60. The engine 10 incorporating reverse bleed apparatus 60 may be installed in an aircraft 1 (FIG. 3) having at least one electrical power source such as a battery and inverter 2, an auxiliary power unit 3, a connection to a ground power unit 4 or other ground-based power source, or another engine 10 having an electrical generator.

Figure 3:
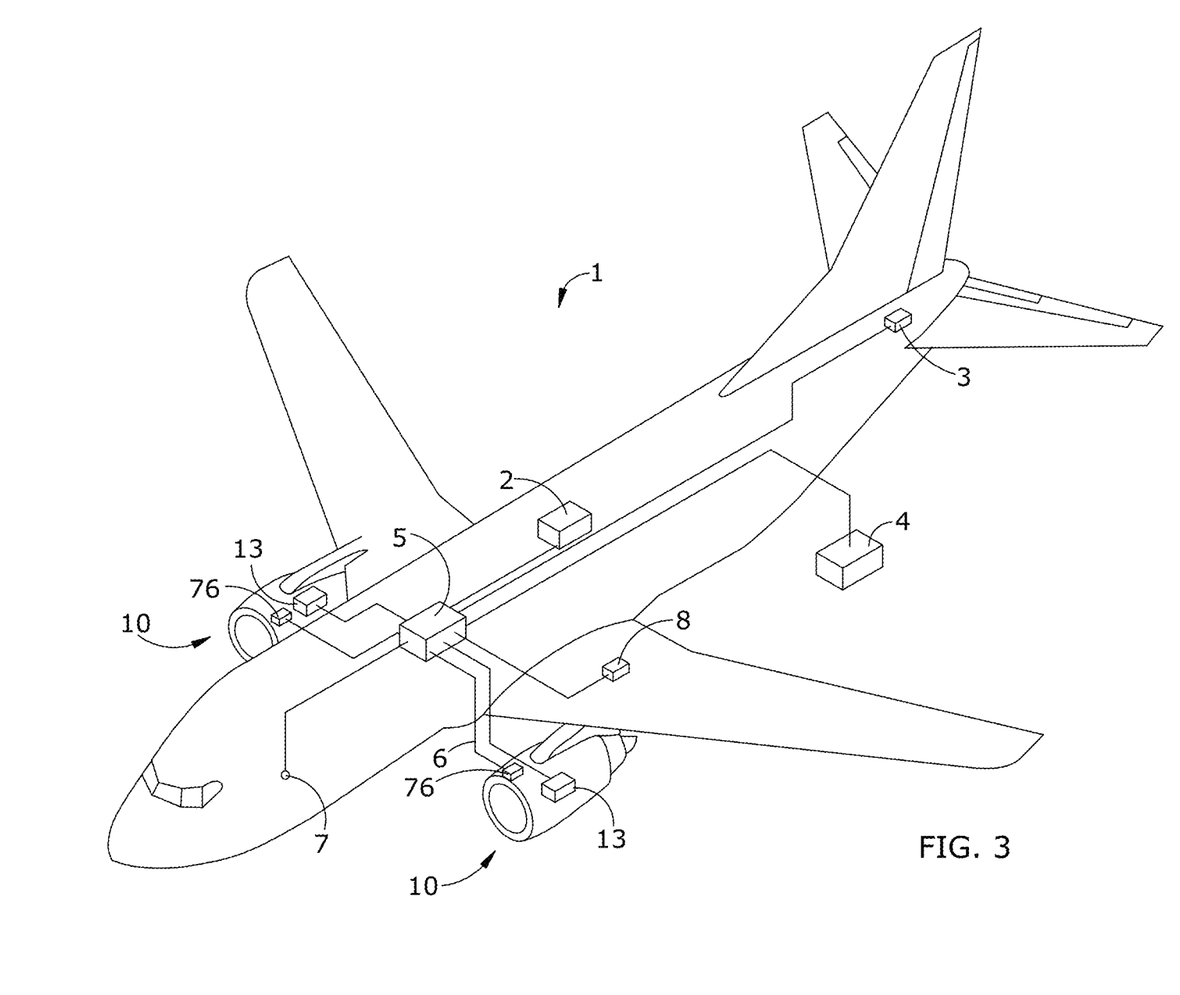
FIG. 3 is a schematic perspective view of the gas turbine engine of FIG. 1 mounted to an aircraft.

In one example, the aircraft 1 includes an electronic aircraft controller 5 in data communication with the engine controller 13 described above and also including a controllable electrical power connection 6 to the cooling blower 76. The aircraft controller 5 may have connections to various inputs such as cockpit switch positions, an/or sensors such as an outside air temperature (OAT) probe 7 or a weight-on-wheels sensor 8.

In one possible method, the engine controller 13 uses one or more data inputs (direct or from the aircraft controller 5) to determine whether the engine 10 is shut down, or in the process of shutting down.

These inputs may include, for example, weight on wheels sensor status, cockpit switch positions, and so forth. The engine controller 13 may confirm the engine 10 is shut down in response to an engine run/stop switch position being in the "stop" position, and a weight on wheels sensor positive indication.

Subsequently, the engine controller 13 uses one or more inputs to determine if reverse bleed cooling is necessary. These inputs may include, for example, engine internal temperature, OAT data, software heat transfer models, and so forth. Engine internal temperature may be sensed, for example, using a T3 sensor 9 (FIG. 2).

The engine controller 13 may make a determination if reverse bleed cooling is necessary based on heat transfer modeling and external temperature. For example, if the aircraft 1 is parked in low environmental temperatures, additional cooling may not be necessary, and operation of the cooling blower 76 at low temperatures may cause excessive wear or damage to the unit. Alternatively, the cooling blower 76 may be operated on every engine shutdown without regard to external temperatures.

If reverse bleed cooling is necessary, the engine controller 13 may use one or more software models to compute the duration of cooling based on factors such as available cooling flow rate and inlet air temperature. In one example, the duration of cooling required may be about 15 to 60 minutes. In another example, the duration of cooling required may be about 30 to 40 minutes.

In general, air temperature at the cooling duct inlet 64 would be higher than outside air temperature because of heat gain as the air passes over internal components. However, even on a "hot day", e.g., outside air temperatures exceeding 38° C. (100° F.), the air temperature at the cooling duct inlet 64 can be expected to be low enough to provide adequate cooling to the fuel nozzles 50. For example, the air temperature may be on the order of 66° C. (150° F.) to 149° C. (300° F.).

The engine controller 13 may send a command to the aircraft controller 5 to provide cooling power, or to provide cooling power for a specified amount of time. In response, the aircraft controller 5 may be programmed to provide electrical power to the cooling blower 76 for the specified amount of time and then to shut off electrical power.

In an alternative configuration, the engine controller 13 may be provided with constant access to an electrical power source such as a battery and inverter, an auxiliary power unit, a connection to a ground power unit, or another engine 10 having an electrical generator. The engine controller 13 may then supply electrical power to the cooling blower 76 directly or through switching equipment such as relays (not shown).

In another alternative configuration, the engine 10 may be provided with separate control equipment (not shown) having constant access to an electrical power source such as a battery and inverter, an auxiliary power unit, a connection to a ground power unit, or another engine 10 having an electrical generator. The separate control equipment may then supply electrical power to the cooling blower 76 directly or through switching equipment such as relays (not shown).

The first valve 70 (or other check valve) may be biased open in the absence of bleed air. If the controllable valve (e.g. second valve 72) is of the passive type described above, it will open automatically in response to the absence of fuel pressure or other "engine running" signal. If a separate actuator is used, this may be commanded to an open position by the engine controller 13 or the aircraft controller 5.

Figure 4:
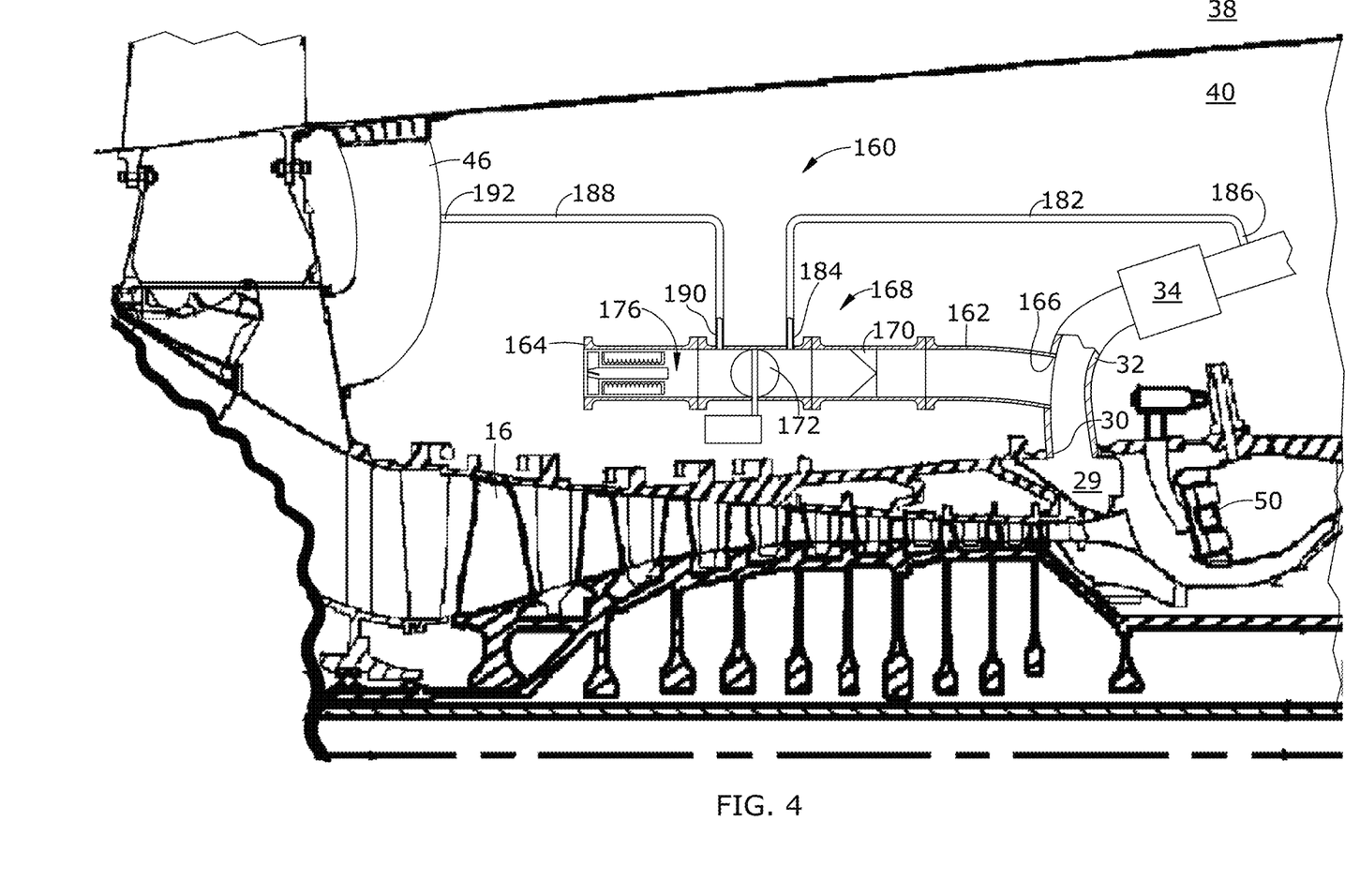
FIG. 4 is a schematic, sectional view of another exemplary embodiment of a reverse bleed apparatus suitable for use of the gas turbine engine in FIG. 1.

FIG. 4 illustrates an alternative reverse bleed apparatus 160 that may be incorporated into the engine 10 and used to supply cooling air to the fuel nozzles 50 through the compressor bleed port 30 when the engine 10 is shut down. The reverse bleed apparatus 160 is similar in overall construction to the apparatus 60.

The reverse bleed apparatus 160 includes a cooling duct 162 disposed in the engine 10. It may be mounted, for example, in the undercowl space 40. The cooling duct has an inlet 164 disposed in fluid communication with a source of cooling air and an outlet 166 disposed in fluid communication with the compressor bleed port 30. The complete cooling duct 162 may be built up from components such as tubes, connectors, pipe joints, and the like. In the embodiment of FIG. 2, the inlet 164 is physically positioned in, and in fluid communication with, the undercowl space 40. In this particular embodiment, the inlet 164 does not ingest debris such as dust, water, or ice; it thus protects the downstream components (e.g., valves, blowers) from such debris. The outlet 166 is connected to existing bleed duct 32 which in turn is connected to the compressor bleed port 30.

The cooling duct 162 incorporates a valve assembly 168 including one or more valves operable to control airflow between the inlet 164 and the outlet 166. In most aspects the valve assembly 168 may be identical to the valve assembly 68 described above. In this example, first and second valves 170, 172 are used in series, where the first valve 170 is a check valve, located closest to the outlet 166.

In the illustrated example, the second valve 172 is a controllable valve having a flow control element (e.g. gate or ball) movable between open and closed positions. It may be a passive fuel valve as described above.

The cooling duct 162 includes a cooling blower 176 between the valve assembly 168 and the inlet 164. The cooling blower 176 may be substantially identical to the cooling blower 76 described above and may include a rotor 178 carrying an array of fan blades.

The valve assembly 168 differs from the valve assembly 68 described above in that it includes auxiliary tubes coupled in fluid communication with the valve assembly 168 and includes an inlet 164 not configured for fluid communication with a bypass duct.

In the illustrated example, there are two auxiliary tubes. One of the auxiliary tubes is a tube 182 having a first end 184 coupled in fluid communication with the cooling duct 162 at a location between the first valve 170 and the second valve 172, and a second end 186 coupled in fluid communication with a low-pressure sink, such as the bleed duct 32 at a location downstream of the bleed control valve 34. This tube 182 may be referred to as a "blowoff tube".

The other auxiliary tube is a tube 188 having a first end 190 coupled in fluid communication with the cooling duct 162 at a location between the second valve 172 and the cooling blower 176, and a second end 192 coupled in fluid communication with a source of cooling air external to the undercowl space 40. In the illustrated example, the second end 192 is connected to an existing bypass duct 46. Tube 188 may be referred to as a "cooling tube".

Operation of the reverse bleed apparatus 160 is generally similar in operation of the reverse bleed apparatus 60.

When the engine 10 is running, the reverse bleed apparatus 160 is inactive. Portions of the cooling air duct 162 will be pressurized or be in thermal contact with high-temperature air coming from the compressor bleed port 30. The valve assembly 168 will block the majority of flow from the outlet 166 towards the inlet 164. As noted above, some valve leakage is expected to occur. The bleed air entering the cooling air duct 162 is at high temperature and pressure, for example approximately 677° C. (1250° F.) and 4 mPa (600 psi). Even with pressure and temperature losses in the cooling duct 162, this can expose the cooling blower 176 to high-temperature air which may shorten its service life.

In this embodiment, the auxiliary tubes 182 and 188 are effective to reduce the temperature and pressure of leakage flow reaching the cooling blower 176 in the following manner. Blowoff tube 182 directs airflow downstream of the closed first valve 170 away from the upstream side of the second valve 172. In one example, the pressure on the upstream side of the second valve 172 may be reduced to approximately 413 kPa (60 psi). The reduction of the pressure differential across the second valve 172 by factor of approximately 10 (as compared to the pressure differential across the first valve 170) results in a reduction in the leakage mass flow rate across the second valve 172 to about one-tenth of the leakage mass flow rate across the first valve 170. In one example, the leakage flow rate across the second valve 172 may be on the order of approximately 0.002 kg/s (0.005 lb/s). The temperature of this gas may be on the order of approximately 480° C. (900° F.).

Simultaneously, the cooling tube 188 introduces a cooling flow into the cooling duct 162 downstream of the second valve 172 which mixes with the aforementioned leakage flow. In the example where the cooling flow is obtained from the bypass duct 46, the temperature of the cooling flow may be on the order of approximately 93° C. (200° F.). Analysis has shown that the resulting temperature of the mixed flow would be well within a limit for the cooling blower 176 to achieve an acceptable service life. For example, the leakage flow temperature at the cooling blower 176 may be on the order of approximately 135° C. (275° F.). This embodiment, which includes a mixed flow and blow-off valve 182, may greatly increase the effectiveness of the valves 170, 172 in reducing leakage flow and temperatures of the gas passing through the blower 176. The remaining leakage flow will pass through the cooling blower 176, inlet 164, and in the example of FIG. 4, into the undercowl space 40 before eventually being exhausted to the atmosphere.

One benefit of the embodiment of FIG. 4 is that the reverse bleed apparatus 160, when being used to force cooling air into the engine core following or during engine shutdown, in addition to this cooling function, is effective to provide an active purge of the undercowl space 40. This purge flow draws in cooling air from an aft vent 41 of the engine 10 and causes it to flow over components positioned in the undercowl space 40, in addition to the flow to and through fuel nozzle valves 51 described above and fuel manifolds connected thereto.

The engine 10 with reverse bleed apparatus 160 may be installed in an aircraft 1 (FIG. 3) substantially as described above for reverse bleed apparatus 60. The operation of the reverse bleed apparatus 160 to move cooling air flow from the inlet 164 through the cooling duct 162, through the outlet 166 and into the compressor bleed port 30 is substantially the same as for the reverse bleed apparatus 60 described above and may utilize the same power and control arrangement. The primary difference is that the source of cooling airflow is the undercowl space 40. During operation of the reverse bleed apparatus 160, it may be expected that some of the flow produced by the cooling blower 176 would pass into the blowoff tube 182 and/or the cooling tube 188. Appropriate sizing of these auxiliary tubes and of the cooling blower 176 will ensure that sufficient cooling flow is available at the outlet 166 for cooling of the fuel nozzles 50. In one example, the auxiliary tubes may have an outside diameter of approximately 3.2 mm (0.125 in.) to about 12.7 mm (0.5 in.).

As a possible alternative, the reverse bleed apparatus 160 could be used to move cooling air flow in the opposite direction as described above, i.e. to "suck" air from the engine 10 rather than "blow" it into the engine 10. In this sense the so-called "reverse bleed" apparatus 160 would be used to cause air movement through the bleed port in the same direction as airflow through the bleed port during flight.

By providing a source of cooling airflow, the example embodiments disclosed herein may significantly reduce or eliminate fuel nozzle coking, and as such, may be effective to reduce or eliminate the need to replace fuel nozzles. Reduction or elimination of fuel nozzle coking will slow or avoid degradation of engine performance over time. The internal reverse bleed system described herein can be simple and inexpensive. Furthermore, as disclosed herein, it may be implemented with, or without external logistical support or equipment to implement, such as ground carts, maintenance personnel, aircraft crew, systems or power sources as desired.

The foregoing has described a reverse bleed apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A gas turbine engine, comprising: a core cowl, a core contained within the core cowl, including a compressor in fluid communication with a downstream combustor and turbine, the compressor including a compressor bleed port, wherein an undercowl space is defined between the core cowl and the core; a cooling duct disposed at least partially in the undercowl space and having an inlet and an outlet, wherein the inlet is in fluid communication with a source of cooling air, and the outlet is in fluid communication with the compressor bleed port; a valve assembly including at least one valve disposed in the cooling duct; and a cooling blower disposed within the engine and operable to move an air flow from the inlet of the cooling duct towards the outlet of the cooling duct and into the compressor bleed port.

2. The engine of any preceding clause, wherein a bypass duct is disposed upstream of the compressor, and the inlet of the cooling duct is in fluid communication with the bypass duct.

3. The engine of any preceding clause, wherein the inlet of the cooling duct is in fluid communication with the undercowl space.

4. The engine of any preceding clause, further including a bleed duct coupled to the compressor bleed port, wherein the outlet of the cooling duct is coupled to the bleed duct.

5. The engine of any preceding clause wherein the valve assembly includes a first valve and a second valve in series fluid communication, the first valve being closer to the outlet of the cooling duct.

6. The engine of any preceding clause wherein at least one of the valves is a check valve.

7. The engine of any preceding clause wherein at least one of the valves is a controllable valve.

8. The engine of any preceding clause wherein at least one of the valves is a fluid-pressure-responsive passive valve.

9. The engine of any preceding clause wherein the first valve is a check valve and the second valve is a controllable valve.

10. The engine of any preceding clause wherein at least one auxiliary tube is connected in fluid communication with the valve assembly.

11. The engine of any preceding clause wherein a blowoff tube has a first end connected to the valve assembly between the first valve and the second valve, and a second end connected to a low-pressure sink.

12. The engine of any preceding clause wherein the low-pressure sink is a bleed duct including a bleed control valve coupled to the compressor bleed port.

13. The engine of any preceding clause wherein a cooling tube has a first end connected to the valve assembly between the second valve and the inlet of the cooling duct.

14. The engine of any preceding clause wherein the cooling tube has a second end connected to a bypass duct disposed upstream of the compressor.

15. The engine of any preceding clause wherein the cooling blower is at least partially disposed within the cooling duct.

16. The engine of any preceding clause wherein the cooling blower is electrically powered.

17. The engine of any preceding clause wherein an electric power source is coupled to provide power to the blower.

18. The engine of any preceding clause wherein the cooling blower is coupled to an electronic control.

19. A gas turbine engine, comprising: a core cowl, a core contained within the core cowl and including a compressor in fluid communication with a downstream combustor and turbine; a compressor bleed duct; a bypass duct located upstream of the compressor bleed duct; an undercowl space defined between the core and core cowl; a cooling duct configured to provide airflow from the bypass duct into the compressor by way of the compressor bleed duct; and a valve assembly including at least one valve disposed in the cooling duct; and a cooling blower disposed within the core cowl and configured for forcing air originating from the bypass duct into the compressor by way of the cooling duct.

20. The engine of any preceding clause wherein the valve assembly includes a first valve and a second valve in series fluid communication, the first valve being closer to the outlet of the cooling duct.

21. The engine of any preceding clause wherein at least one of the valves is a check valve.

22. The engine of any preceding clause wherein at least one of the valves is a controllable valve.

23. The engine of any preceding clause wherein at least one of the valves is a fluid-pressure-responsive passive valve.

24. The engine of any preceding clause wherein the first valve is a check valve and the second valve is a controllable valve.

25. The engine of any preceding clause wherein the cooling blower is at least partially disposed within the cooling duct.

26. The engine of any preceding clause wherein the cooling blower is electrically powered.

27. A gas turbine engine, comprising: a core cowl, a core contained within the core cowl and including a compressor in fluid communication with a downstream combustor and turbine; a compressor bleed duct; an undercowl space defined between the core and the core cowl; a cooling duct configured to provide airflow from the undercowl space into the compressor by way of the compressor bleed duct; at least one valve disposed in the first duct; and a cooling blower disposed within the core cowl and configured for forcing air occupying the undercowl space into the compressor by way of the cooling duct.

28. The engine of any preceding clause wherein the valve assembly includes a first valve and a second valve in series fluid communication, the first valve being closer to the outlet of the cooling duct.

29. The engine of any preceding clause wherein at least one of the valves is a check valve.

30. The engine of any preceding clause wherein at least one of the valves is a controllable valve.

31. The engine of any preceding clause wherein at least one of the valves is a fluid-pressure-responsive passive valve.

32. The engine of any preceding clause wherein the first valve is a check valve and the second valve is a controllable valve.

33. The engine of any preceding clause wherein the cooling blower is at least partially disposed within the cooling duct.

34. The engine of any preceding clause wherein the cooling blower is electrically powered.

35. The engine of any preceding clause wherein an electric power source is coupled to provide power to the cooling blower.

36. The engine of any preceding clause wherein the cooling blower is coupled to an electronic control.

37. A method comprising: using an engine comprising an undercowl space, a compressor in fluid communication with a downstream combustor and turbine, and a bypass duct upstream of the compressor, wherein the compressor includes a compressor bleed port; at a time when the engine is operating, substantially preventing airflow from the compressor bleed port to the bypass duct; at a time when the engine is shut down, allowing airflow from the bypass duct to the compressor bleed port, and operating a cooling blower internal to the cowl to force air from the bypass duct to the compressor bleed port.

38. The method of any preceding clause wherein: the step of substantially preventing airflow includes positioning one or more valves in a closed position; and the step of allowing airflow includes positioning the one or more valves in an open position.

39. The method of any preceding clause further comprising, prior to positioning the one or more valves in an open position and operating the cooling blower, determining that the engine is shut down and on the ground by reference to at least one sensor signal associated with an aircraft.

40. The method of any preceding clause wherein the one or more valves are positioned in a closed position in response to fluid pressure generated by the engine during operation, and the one or more valves are positioned in an open position in response to absence of fluid pressure generated by the engine.

41. The method of any preceding clause wherein the cooling blower is operated for a predetermined amount of time after the engine is shut down.

42. The method of any preceding clause wherein the predetermined amount of time is computed using an electronic engine controller of the engine in response to at least one sensor input.

43. The method of any preceding clause wherein: the engine is mounted in an aircraft; the predetermined amount of time is communicated to an electronic aircraft controller of the aircraft from the engine controller; and in response to the communication from engine controller, the aircraft controller provides power to the cooling blower for the predetermined amount of time.

44. The method of any preceding clause wherein: the engine is mounted in an aircraft; a requirement for cooling is communicated to an electronic aircraft controller of the aircraft from the engine controller; and in response to the communication from engine controller, the aircraft controller provides power to the cooling blower.

45. A method comprising: using an engine comprising a cowl, an undercowl space, a compressor in fluid communication with a downstream combustor and turbine, wherein the compressor includes a compressor bleed port; at a time when the engine is operating, substantially preventing airflow from the bleed port to the undercowl space; at a time when the engine is shut down, permitting airflow from the undercowl space to the compressor and operating a cooling blower located internal to the cowl to cause air to flow from the undercowl space into the compressor bleed port.

46. The method of any preceding clause wherein: the step of substantially preventing airflow includes positioning one or more valves in a closed position; and the step of allowing airflow includes positioning the one or more valves in an open position.

47. The method of any preceding clause further comprising, prior to positioning the one or more valves in an open position and operating the cooling blower, determining that the engine is shut down by reference to at least one sensor signal associated with an aircraft.

48. The method of any preceding clause wherein the one or more valves are positioned in a closed position in response to fluid pressure generated by the engine during operation, and the one or more valves are positioned in an open position in response to absence of fluid pressure generated by the engine.

49. The method of any preceding clause wherein the cooling blower is operated for a predetermined amount of time after the engine is shut down.

50. The method of any preceding clause wherein the predetermined amount of time is computed using an electronic engine controller of the engine in response to at least one sensor input.

51. The method of any preceding clause wherein: the engine is mounted in an aircraft; the predetermined amount of time is communicated to an electronic aircraft controller of the aircraft from the engine controller; and in response to the communication from engine controller, the aircraft controller provides power to the cooling blower for the predetermined amount of time.

52. The method of any preceding clause further comprising, when the engine is operating: admitting engine bleed air into the cooling duct from the compressor bleed port; directing some of the engine bleed air out of the cooling duct away from the one or more valves in order to reduce a pressure differential across at least one of the valve; and admitting cooling airflow from a cooling source into the cooling duct between at least one of the valves and the cooling blower and mixing the cooling airflow with the bleed air so as to reduce the temperature of the engine bleed air prior to it contacting the cooling blower.

53. A method, including: using an engine comprising a core cowl, an under cowl space, and a compressor in fluid communication with a downstream combustor and turbine, the compressor having a compressor bleed port; operating the engine; shutting the engine down; and after or during engine shutdown, operating a cooling blower internal to the core cowl, to force air through at least a portion of a flowpath of the engine by way of the compressor bleed port.

54. The method of any preceding clause wherein the cooling blower is operated for a predetermined amount of time after the engine is shut down.

55. The method of any preceding clause wherein the predetermined amount of time is computed using an electronic engine controller of the engine in response to at least one sensor input.

56. The method of any preceding clause wherein: the engine is mounted in an aircraft; the predetermined amount of time is communicated to an electronic aircraft controller of the aircraft from the engine controller; and in response to the communication from engine controller, the aircraft controller provides power to the cooling blower for the predetermined amount of time.

57. The method of any preceding clause wherein: the engine is mounted in an aircraft; a requirement for cooling is communicated to an electronic aircraft controller of the aircraft from the engine controller; and in response to the communication from engine controller, the aircraft controller provides power to the cooling blower.

58. The method of any preceding clause further comprising: at a time when the engine is operating, positioning one or more valves in a closed position, so as to block airflow between the cooling blower and the compressor bleed port; at a time when the engine is shut down, positioning the one or more valves in an open position to permit airflow from the cooling blower to the compressor bleed port.

59. The method of any preceding clause further comprising, prior to positioning the one or more valves in an open position and operating the cooling blower, determining that the engine is shut down and on the ground by reference to at least one sensor signal associated with an aircraft.

60. The method of any preceding clause wherein the one or more valves are positioned in a closed position in response to fluid pressure generated by the engine during operation, and the one or more valves are positioned in an open position in response to absence of fluid pressure generated by the engine.

61. A method, including: using an engine comprising a core cowl, an under cowl space, and a compressor in fluid communication with a downstream combustor and turbine, the compressor having a compressor bleed port; operating the engine; shutting the engine down; and after or during engine shutdown, operating a cooling blower internal to the engine, to draw air from a portion of the engine downstream of the compressor and force the air out the compressor bleed port.

What is claimed is:

1. A method, comprising:
    using an engine comprising a cowl, an undercowl space, a compressor in fluid communication with a downstream combustor and turbine, and a compressor bleed port;
    at a time when the engine is operating, substantially preventing airflow from the compressor bleed port to the undercowl space;
    at a time when the engine is shut down, permitting airflow from the undercowl space to the compressor and operating a cooling blower located internal to the cowl to cause the airflow from the undercowl space to flow into the compressor bleed port.

2. The method of claim 1, wherein:
    the step of substantially preventing the airflow includes positioning one or more valves in a closed position; and
    the step of permitting airflow includes positioning the one or more valves in an open position.

3. The method of claim 2, wherein the one or more valves are positioned in the closed position in response to fluid pressure generated by the engine during operation, and the one or more valves are positioned in the open position in response to absence of fluid pressure generated by the engine.

4. The method of claim 2, further comprising, when the engine is operating:
    admitting engine bleed air into the cooling duct from the compressor bleed port;
    directing some of the engine bleed air out of the cooling duct away from the one or more valves in order to reduce a pressure differential across at least one of the valves; and
    admitting cooling airflow from a cooling source into the cooling duct between at least one of the valves and the cooling blower and mixing the cooling airflow with the bleed air so as to reduce the temperature of the engine bleed air prior to it contacting the cooling blower.

5. The method of claim 1, further comprising, prior to operating the cooling blower, determining that the engine is shut down by reference to at least one sensor signal associated with an aircraft.

6. The method of claim 1, wherein the cooling blower is operated for a predetermined amount of time after the engine is shut down.

7. The method of claim 6, wherein the predetermined amount of time is computed using an electronic engine controller of the engine in response to at least one sensor input.

8. The method of claim 7, wherein:
    the engine is mounted in an aircraft;
    the predetermined amount of time is communicated to an electronic aircraft controller of the aircraft from the engine controller; and
    in response to the communication from the electronic engine controller, the electronic aircraft controller provides power to the cooling blower for the predetermined amount of time.

9. The method of claim 1, wherein the airflow permitted from the undercowl space to the compressor bleed port flows through at least a portion of a flowpath of the engine.

10. The method of claim 1, wherein:
    the engine is mounted in an aircraft;
    a requirement for cooling is communicated to an electronic aircraft controller of the aircraft from an engine controller; and
    in response to the communication from the engine controller, the electronic aircraft controller provides power to the cooling blower.

11. The method of claim 1, further comprising, prior to operating the cooling blower, determining that the engine is shut down by reference to at least one sensor signal associated with the engine.

12. A method, including:
    using an engine comprising a core cowl, an undercowl space, and a compressor in fluid communication with a downstream combustor and turbine, the compressor having a compressor bleed port in a casing that defines a compressor flowpath;
    operating the engine;
    shutting the engine down; and
    after or during engine shutdown, operating a cooling blower internal to the core cowl, to force air through at least a portion of a flowpath of the engine by way of the compressor bleed port.

13. The method of claim 12, wherein the air forced through the flowpath also flows through the undercowl space.

14. The method of claim 13, wherein the cooling blower is operated for a predetermined amount of time, and the predetermined amount of time is computed using an electronic engine controller of the engine in response to at least one sensor input.

15. The method of claim 14, wherein:
    the engine is mounted in an aircraft;
    the predetermined amount of time is communicated to an electronic aircraft controller of the aircraft from an engine controller; and
    in response to the communication from the engine controller, the electronic aircraft controller provides power to the cooling blower for the predetermined amount of time.

16. The method of claim 12, wherein:
    the engine is mounted in an aircraft;
    a requirement for cooling is communicated to an electronic aircraft controller of the aircraft from the engine controller; and
    in response to the communication from engine controller, the aircraft controller provides power to the cooling blower.

17. The method of claim 12, further comprising:
    at a time when the engine is operating, positioning one or more valves in a closed position, so as to block airflow between the cooling blower and the compressor bleed port;
    at a time when the engine is shut down, positioning the one or more valves in an open position to permit airflow from the cooling blower to the compressor bleed port.

18. The method of claim 12, further comprising, prior to operating the cooling blower, determining that the engine is shut down and on the ground by reference to at least one sensor signal associated with an aircraft.

19. The method of claim 18, wherein one or more valves are positioned in a closed position in response to fluid pressure generated by the engine during operation, and the one or more valves are positioned in an open position in response to absence of fluid pressure generated by the engine.

20. A method, comprising:
using an engine comprising a cowl, an undercowl space, a compressor in fluid communication with a downstream combustor and turbine, and a compressor bleed port in a casing that defines a compressor flowpath;
at a time when the engine is operating, substantially preventing airflow from flowing through the bleed port;
at a time when the engine is shut down, permitting airflow through the compressor bleed port and operating a cooling blower located internal to the cowl to cause air to flow into the compressor bleed port.

21. The method of claim 20, wherein:
the step of substantially preventing airflow includes positioning one or more valves in a closed position; and
the step of causing air to flow into the compressor bleed port includes positioning the one or more valves in an open position.

22. The method of claim 21, wherein the one or more valves are positioned in the closed position in response to fluid pressure generated by the engine during operation, and the one or more valves are positioned in the open position in response to absence of fluid pressure generated by the engine.

23. The method of claim 21, further comprising, when the engine is operating:
admitting engine bleed air into the cooling duct from the compressor bleed port;
directing some of the engine bleed air out of the cooling duct away from the one or more valves in order to reduce a pressure differential across at least one of the valves; and
admitting cooling airflow from a cooling source into the cooling duct between at least one of the valves and the cooling blower and mixing the cooling airflow with the bleed air so as to reduce the temperature of the engine bleed air prior to it contacting the cooling blower.

24. The method of claim 20, further comprising, prior to operating the cooling blower, determining that the engine is shut down by reference to at least one sensor signal associated with an aircraft.

25. The method of claim 20, wherein the cooling blower is operated for a predetermined amount of time after the engine is shut down.

26. The method of claim 25, wherein the predetermined amount of time is computed using an electronic engine controller of the engine in response to at least one sensor input.

27. The method of claim 26, wherein:
the engine is mounted in an aircraft;
the predetermined amount of time is communicated to an electronic aircraft controller of the aircraft from the electronic engine controller; and
in response to the communication from the electronic engine controller, the electronic aircraft controller provides power to the cooling blower for the predetermined amount of time.

* * * * *